Aug. 18, 1931.       J. S. MORGAN       1,819,193
ROTARY MACHINE LOCKING DEVICE
Filed June 25, 1928

Inventor
John S. Morgan
By Lyon & Lyon
Attorney

Patented Aug. 18, 1931

1,819,193

UNITED STATES PATENT OFFICE

JOHN S. MORGAN, OF TORRANCE, CALIFORNIA, ASSIGNOR TO THE NATIONAL SUPPLY COMPANY OF DELAWARE, OF NEW YORK, N. Y., A CORPORATION OF DELAWARE

ROTARY MACHINE LOCKING DEVICE

Application filed June 25, 1928. Serial No. 287,940.

This invention relates to a rotary machine, and is more particularly related to a rotary machine including a device for locking the split table bushing of a rotary machine to the spider of the rotary machine to hold the split table bushing and spider against relative vertical movement.

An object of this invention is to provide a locking device which is of simple construction for locking the split table bushing of a rotary machine to the spider to hold the split table bushing and spider from relative vertical movement or displacement.

Another object of this invention is to provide a locking device for locking the split table bushing to the spider of a rotary machine and which locking device is of such a construction that the same will be moved to locking position when the drill stem bushing is inserted in the split table bushing.

Other objects and advantages of this invention it is believed will be apparent from the following detailed description of a preferred embodiment thereof as illustrated in the accompanying drawings:

Figure 1:
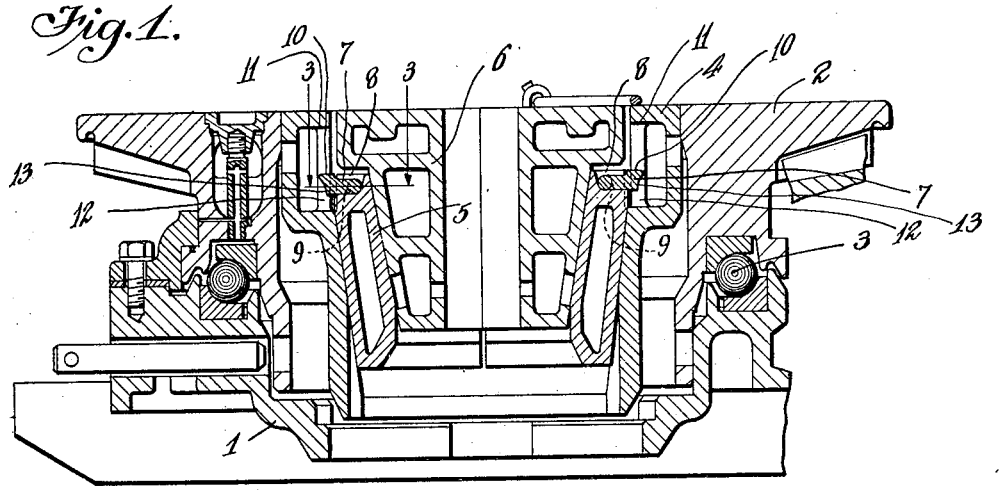
Figure 1 is a vertical sectional view of a rotary machine illustrating the locking device embodying this invention as in locked position and between the split table bushing and spider of the rotary machine.

In the preferred embodiment of this invention illustrated in the accompany drawings, 1 indicates the base of a rotary machine upon which the table 2 is rotatably supported on bearings 3. The base 1, table 2 and bearings 3 may be of any suitable or desirable construction as is well understood in the art and form no part of this invention.

Mounted within the table 1 is a spider 4 which is nested within the vertically extending bore formed through the table 2. The spider 4 may be of any suitable or desirable construction as is well understood in the art, and is herein illustrated as of the same construction shown in the co-pending application of John D. Spalding filed February 18, 1926, Serial No. 89,058. Nested within the spider 4 is a split table bushing 5 which is formed of a plurality of segments or sections in a manner well understood in the art. The split table bushing 5, as is customary in the art, is formed with a tapered bore extending vertically upward through the split table bushing 5. Mounted within the tapered bore of the split table bushing 5 is the drill stem bushing 6.

A hinged block 7 is mounted within a recess 8 formed in the upper end of the split table bushing 5 and is hingedly supported upon cylindrical extensions or pins 9. The block 7 provides a shoulder 10 which, when the block 7 is rotated to locking position, is supported in position to engage a shoulder 11 at the upper end of the recess 12 formed in the spider 4. The hinged block 7 is cut away at 13 to enable the block 7 to be rotated into position in the recess 12 after the split table bushing 5 has been lowered into position within the bore of the spider 4. The block 7 is cut away at 13 to enable the block 7 to be rotated to locked position in the recess 12 and to pass the edge of the shoulder 11 more freely as the bushing 5 is being lowered into spider 4.

Figure 2:
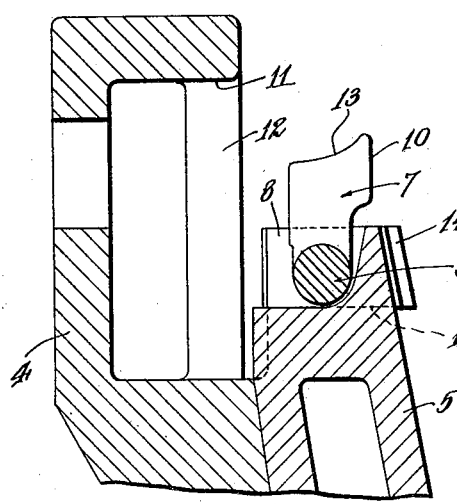
Figure 2 is a detached sectional view of the spider and split table bushing illustrating the locking means embodying this invention as moved to unlocking position to permit the split table bushing to be removed from the spider.
Figure 3:
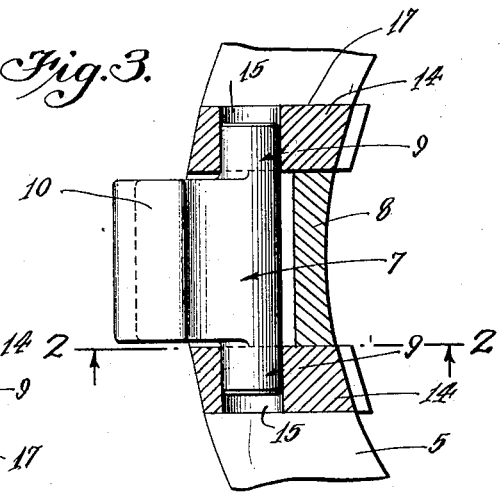
Figure 3 is a top plan view partially in section taken on line 3—3 of the assembly shown in Figure 1.

As illustrated in Figure 2, with the hinged block 7 out of locking position, it is impossible to lower the split drill stem bushing 6 into position within the table bushing 5 as the block 7 will, when in this position, hold the drill stem bushing out of proper position operative relation. The lowering of the split drill stem bushing into the bore formed through the table bushing will, however, result in the block 7 being rotated on the pins 9 into the recess 12, thereby permitting the drill stem bushing to be positioned in operative relation relative to the table bushing but only when the block 7 has been rotated to position to hold the drill stem bushing from vertical upward movement relative to the spider 4. The block 7 is caused to rotate to locking position with relation to the spider 4 by the flange of the drill stem bushing 6 engaging the upper end of the block 7 when the block 7 is in the position shown in Figure 2, and causing the block 7 to rotate on the pins or extensions 9 thereof as the drill stem bushing is dropped into the table bushing 5.

Each of the sections or segments of the split drill stem bushing carries a lock block 7 of the same construction all of which are adapted to pass into recesses 12 formed in diametrically opposed portions of the spider 4.

In supporting the lock hinged block 7 on the split drill stem bushing, hinged blocks 14 are employed which are provided with bores 15 into which the cylindrical extension 9 of the lock hinge 7 extend. The hinged blocks 14 are mounted on the cylindrical extensions of the lock hinge 7 and then the assembly is placed within the recess 17 formed at the upper end of the split table bushings 5 and the blocks 14 are welded into position.

Having fully described my invention, it is to be understood that I do not wish to be limited to the details of construction herein set forth as my invention is susceptible to modifications without departing from the spirit thereof as defined in the appended claims.

I claim:

1. In a rotary machine, a rotary table having a bore therethrough, a spider nested therein, a split table bushing mounted in the spider, a lock hinge mounted in a recess formed in the split bushing and adapted to be rotated in a vertical plane into a recess formed in the spider to engage a shoulder formed on the spider and hold the split table bushing from upward vertical displacement.

2. In a rotary machine, a rotary table having a bore therethrough, a spider nested therein, a split table bushing mounted in the spider, a lock hinge mounted in a recess formed in the split table bushing and adapted to be rotated in a vertical plane into a recess formed in the spider to engage a shoulder formed on the spider and hold the split table bushing and spider from relative vertical displacement.

3. In a rotary machine, a rotary table having a bore therethrough, a spider nested therein, a split table bushing mounted in the spider, a lock hinge secured to a split table bushing and adapted to be rotated in a vertical plane into position to engage the shoulder formed on the spider and hold the split table bushing and spider from relative vertical displacement.

4. In a device of the class described, the combination of a spider, a split table bushing nested in the spider, a lock hinge rotatably secured to the bushing at the upper end thereof, and adapted to be rotated into position to engage a shoulder formed on said spider and hold the spider and split bushing from relative vertical displacement, and a drill stem bushing adapted to be nested within the split bushing, the lock hinge providing a stop holding the drill stem bushing from seating in the split table bushing until rotated into locking position.

5. In a rotary machine, a rotary table having a bore therethrough, a spider nested therein, a split table bushing mounted in the spider, a lock block, a horizontal hinge pin on which the lock block is rotatably supported, the hinge pin being mounted in a recess formed in the split table bushing, and the block being adapted to be rotated into a recess formed in the spider to engage a shoulder formed on the spider and hold the split table bushing and spider from relative vertical displacement.

6. In a rotary machine, a rotary table having a bore therethrough, a spider nested therein, a split table bushing mounted in the spider, lock blocks, horizontal hinge pins on which the lock blocks are rotatably supported, the hinge pins being mounted in recesses formed in diametrically opposed portions of the split table bushings, and the blocks being adapted to be rotated into recesses formed in the spider to engage shoulders formed on the spider and hold the split table bushing and spider from relative vertical displacement.

7. In a rotary machine, a rotary table having a bore therethrough, a spider nested therein, a split table bushing mounted in the spider, a lock block, a horizontal hinge pin on which the lock block is rotatably supported, the hinge pin being mounted in a recess formed in the split table bushing and the block being adapted to be rotated into a recess formed in the spider to engage a shoulder formed on the spider and hold the split table bushing and spider from relative vertical displacement, and a drill stem bushing adapted to be inserted into the split bushing, the lock blocks providing stops holding the drill stem bushing from seating in the split table bushing until rotated into locking position within said recesses of the spider.

8. In a rotary machine, a rotary table having a bore therethrough, a spider nested therein, a split table bushing mounted in the spider, a drill stem bushing mounted in the split table bushing, a lock block, means secured to the split table bushing for supporting the lock block, and the lock block being supported in position to be engaged by the drill stem bushing to hold the drill stem bushing from being lowered into the split table bushing until the said lock block is moved to within a recess formed in the spider to engage a shoulder formed on the spider and thereby hold the split table bushing and spider from relative vertical displacement.

Signed at Torrance, Cal., this 18th day of June 1928.

JOHN S. MORGAN.